Figure 1:
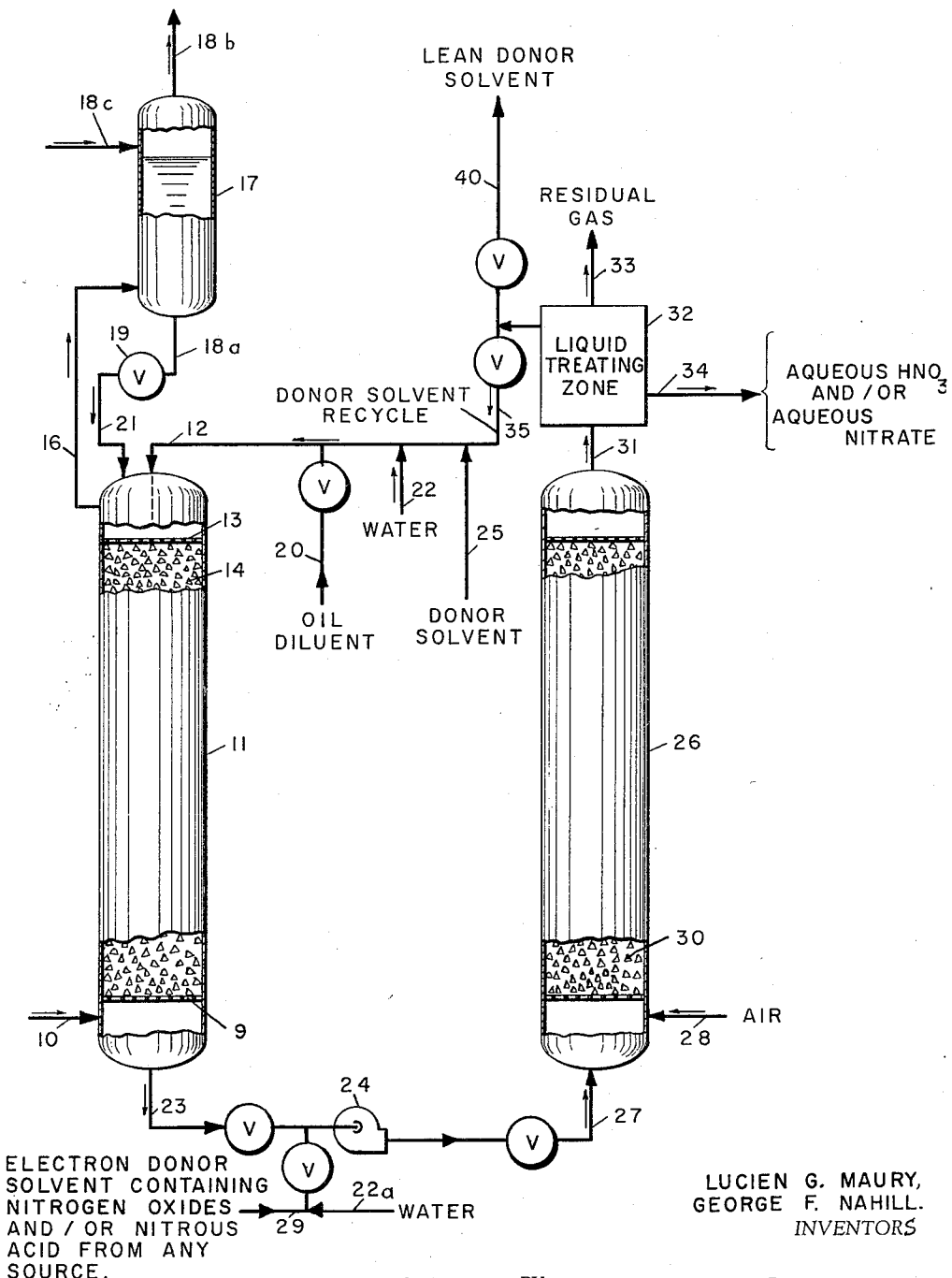

LUCIEN G. MAURY,
GEORGE F. NAHILL.
INVENTORS

BY Ernest G. Peterson
AGENT.

LUCIEN G. MAURY,
GEORGE F. NAHILL.
INVENTORS

3,044,853
SEPARATION OF SOLVATED FIXED NITROGEN FROM COMPOUNDS CONTAINING SAME

Lucien G. Maury, Newark, and George F. Nahill, Wilmington, Del., assignors to Hercules Powder Company, Wilmington, Del., a corporation of Delaware
Filed May 29, 1958, Ser. No. 738,813
14 Claims. (Cl. 23—157)

This invention relates to the separation of nitrogen oxides and/or nitrous acid, as fixed nitrogen, from electron donors containing same, by oxidation of the nitrogen compounds to nitric acid and recovery of the resulting nitric acid as aqueous acid or a salt thereof. In one aspect, this invention relates to the separation of nitrogen oxides and nitrous acid, from fluids containing same, by absorption in an electron donor material, and to the removal of the absorbed fixed nitrogen from the resulting enriched donor material. In another aspect, this invention relates to a process for the absorption of nitrogen oxides and/or nitrous acid from gases containing same, in an electron donor solvent, and for the substantially simultaneous oxidation of the absorbed fixed nitrogen to nitric acid, followed by removal of the resulting nitric acid from the system by extraction either in form of the free acid or a salt thereof. In still another aspect, this invention relates to the separation of nitrogen oxides and nitrous acid from an electron donor containing same by oxidation to convert the nitrogen compounds to nitric acid followed by water extraction of the nitric acid as aqueous nitric acid. In still another aspect, this invention relates to the separation of nitrogen oxides and/or nitrous acid from an electron donor containing same by oxidation to convert the nitrogen compounds to nitric acid followed by reaction of the nitric acid therein with ammonia or aqueous alkali metal (including ammonium) hydroxide and removal of the resulting nitrate as aqueous nitrate in high concentration.

In our copending application Serial No. 738,717, filed May 29, 1958, is disclosed and claimed a process for the utilization of certain electron donor compounds as selective absorbents for nitrogen oxides and nitrous acid, the said electron donor compounds being chemically reactive with the nitrogen oxides and/or nitrous acid only by sharing electrons therewith, and also exhibiting selective solvent action for acetylene. A still more efficient absorption of nitrogen oxides and/or nitrous acid is achieved in the practice of the process of the said copending application when water is present in the donor compound in controlled proportions.

When referring to electron donor compounds herein, and in the above referred to copending application, it is meant compounds that possess at least one unshared pair of electrons which can become attached to a molecule capable of accepting an electron pair. Many electron donor-acceptor pairs are known, the donor-acceptor combination being referred to either as a complex or a solvation. The latter term is generally that applicable to those bonds which are "weak" or "loose" and can be broken, employing conventional means, for recovery of fixed nitrogen from the enriched solvent.

Electron donor solvents suitable for sharing electrons with acetylene to form a resulting bond with acetylene, as above described, are set forth in General Papers Presented Before the Division of Petroleum Chemistry of the American Chemical Society, No. 31, March 29 to April 1, 1954, Kansas City, Missouri.

Exemplary of electron donor compounds described herein are: trialkyl phosphates, e.g., tributyl phosphate, triethylphosphate, and tri-2-ethylhexyl phosphate; dialkyl acid phosphates, e.g., diethyl acid phosphate and dilauryl acid phosphate; mixed dialkyl, monoalkyl phosphates, e.g., a mixture of mono- and di-lauryl acid phosphates; triaryl phosphates, e.g., triphenyl phosphate, tricresyl phosphate; diaryl, monoaryl and mixed mono- and diaryl phosphates, e.g., mixtures of mono- and di-phenyl acid phosphates; nitriles, e.g., benzonitrile, stearyl nitrile, adiponitrile, amides, e.g., dimethylformamide, dimethylbenzamide, methyl nonamide; ethers, preferably cyclic ethers and ethers containing more than one ether linkage, e.g., dioxane, tetrahydrofuran, triethyleneglycol dimethyl ether, ethylene glycol dimethyl ether, and Carbowax (trade name for a number of polyethylene glycol ethers of various molecular weights); sulfoxides, e.g., dimethylsulfoxide and diethylsulfoxide; certain acetals, e.g., dimethyl acetals; compounds containing two or more of the functional groups mentioned above such as hexamethyl phosphoramide, ethyl ether of 2-hydroxyacetonitrile; organic acids, e.g., acetic acid; esters of organic acids, e.g., ethyl acetate; and certain ketones and aldehydes.

The function of the water so far as the improvement of the adsorption efficiency of the donor compound is concerned appears to involve reaction of the solvated ions to form solvated nitrous and/or solvated nitric acid, thereby moving the position of the equilibrium between the nitrogen oxides and the solvated species away from the oxides, the result being concomitantly lower vapor pressure of the nitrogen oxide. Although the optimum water concentration depends upon several factors, the donor will generally contain from 2 to 25 weight percent water.

Donor solvent miscible-water immiscible diluent materials are used in the solvent for the purpose of effecting control of water concentration therein, there being a limited water concentration range for effecting maximum absorption efficiency. When employing a diluent, it is preferred that the donor solvent be one which is partially miscible with water and to regulate the water concentration in the solvent by the presence of an amount of diluent to provide the desired water concentration at saturation so that a water saturated solvent can be utilized. The degree of dilution, base upon the volume ratio of donor solvent to diluent is generally within the range of from 0.2:1 to 5:1, although values outside that range can be employed depending upon the solvent utilized and the composition of the gas treated. Exemplary diluent materials are hydrocarbon liquids such as kerosene, gas oils, saturated fuel oils, aromatic hydrocarbons and the like, and halogenated aromatics and aliphatics, nitroaromatics, aromatic ethers and various donor solvents themselves.

Electron donor compounds particularly preferred in the practice of the invention of the above referred to copending application, are dimethylformamide, triethyleneglycol dimethyl ether, dimethylsulfoxide, hexamethyl phosphoramide, and tri-n-butyl phosphate, in view of the ease with which water content therein can be regulated by the presence of a diluent.

Although liquid electron donor compounds are more generally utilized in carrying out the process of the above referred to copending application, solid donor compounds can also be employed. By way of illustration, a slurry of such a solid donor, e.g., triphenyl phosphate, ground to pass 200 mesh is suspended in an aqueous solution by a gas stream flowing through the suspension and containing the fixed nitrogen to be absorbed, under which conditions the absorption takes place. The solid donor can also be utilized as a fixed bed by absorption of water on the solid absorbent and then passing the nitrogen oxide and/or nitrous acid-containing gas stream through the bed. The same equilibria apply whether the electron donor is solid or liquid.

Electron donor solvents are advantageously employed in accordance with the process of the above said copending application in the separation of nitrogen oxides from gases such as effluent gases from ammonia oxidation and nitrogen fixation, which usually contain from 2 to about 10 volume percent nitrogen oxides. However, the donor solvents are advantageously applied to the scrubbing of residual nitrogen oxides from waste gas streams containing same in low concentration, for example, a by-product stream from the nitration of cellulose and containing from about 0.1 to 0.3 volume percent or more of nitrogen oxides. The said solvents can, however, be utilized for other purposes such as a medium for reactions involving liberation of nitrogen oxides wherein the said solvent retains the liberated oxides to facilitate certain equilibrium conditions, which oxide must then be removed from the solvent prior to reuse of same. Exemplary of such process reactions are the nitration of aromatic or aliphatic compounds, nitric acid oxidation of aromatic or aliphatic compounds the nitrosation or diazotization of organic amines, amides or imides and the processing of certain ores and metals.

Although conventional distillation steps including vacuum distillation and distillation at elevated temperatures, extraction with aqueous base, and the like, can be employed in the removal of the oxides and/or nitrous acid from the enriched donor compound, these methods involve high time and equipment requirements and are accordingly disadvantageously applied and particularly so to continuous type operation. Further, in such continuous operation, the donor solvent to be recycled to the absorption system contains, unnecessarily, up to several percent of residual absorbed fixed nitrogen in view of the limited time available for effecting substantially complete separation of those absorbed materials therefrom.

This invention is concerned with a method utilizing an oxidation step for the removal of nitrogen oxides and nitrous acid from electron donor materials containing same and provides a highly efficient separation which is particularly adaptable to continuous flow operation.

An object of the invention is to provide a process for the removal of nitrogen oxides and/or nitrous acid from electron donor materials containing same. Another object is to provide a continuous flow type method for the removal of nitrogen oxides and/or nitrous acid from electron donor solvents containing same, by a combination of oxidation and nitric acid extraction steps. Another object is to provide for the formation of ammonium nitrate from nitric acid in an electron donor solvent by reaction with ammonia followed by extraction of the resulting ammonium nitrate salt. Another object is to provide a method for the recovery of fixed nitrogen from enriched electron donor solvents previously employed as selective solvent in the absorption of nitrogen oxides and/or nitrous acid from a fluid containing same. Another object is to provide a method for the manufacture of nitric acid and salts thereof from a stream containing nitrogen oxides and/or nitrous acid by simultaneously absorbing the oxide and/or nitrous acid and oxidizing same to nitric acid for extraction as aqueous nitric acid or a salt thereof. Other objects and aspects will be apparent in light of the accompanying disclosure and the appended claims.

In accordance with the invention, an electron donor compound is separated from nitrogen compounds of the group of nitrogen oxides and nitrous acid contained therein in solvated form by contacting the said donor compound with an oxidizing agent in the presence of a Lewis acid under conditions for converting said nitrogen compounds to nitric acid, and when a nitrogen oxide is present, maintaining a sufficient amount of water in the zone of said contacting to react with the said oxide to form nitric acid, and then removing nitric acid, so produced, from the said compound.

The oxidation step can be carried out at any temperature suitable for oxidizing nitrous acid to nitric acid utilizing free oxygen as the oxidizing agent. The oxidation rate is sufficiently high at temperatures in the order of 20–30° C. that higher temperatures, although they can be employed, are generally not required. However, in any event, the maximum temperature is limited by the stability of the particular electron donor solvent employed.

Illustrative of top upper temperature levels employed in carrying out the oxidation are those of certain solvents set forth in the following tabulation.

| Electron Donor Solvent | Upper Temperature Limit, ° C. | Preferred Upper Limit, ° C. |
| --- | --- | --- |
| 1. Tri-n-butylphosphate | 150 | 100 |
| 2. Triphenylphosphate | 200 | 150 |
| 3. Dimethylformamide | 100 | 80 |
| 4. Dimethylsulfoxide | 60 | 50 |
| 5. Triethylene glycol dimethyl ether | 160 | 100 |
| 6. Dioxane | 70 | 40 |
| 7. Diethylene glycol dimethyl ether | 150 | 100 |
| 8. Tricresylphosphate | 150 | 100 |

The oxidation rate is dependent upon certain variables, and, in the case of nitrous acid in tri-n-butyl phosphate donor, appears to fit the following expression:

$$\frac{-d[HNO_2]}{dt} = K_1 \cdot \frac{[N+3][A]}{[\text{Tri-n-butyl phosphate}][H_2O]}$$

wherein $t$ is in minutes, $[N+3]$ represents molar concentration of the nitrogen compound, and $[A]$ represents the effective concentration of the Lewis acid (moles per liter). In any event, the rate of oxidation increases with decreased concentration of water and/or electron donor solvent and with increased concentration of nitrogen oxides and nitrous acid and also with increasing concentration of Lewis acid.

Extremely weak Lewis acid catalysts are much less suitable in the practice of the invention. Accordingly we prefer an acid catalyst having a Hammett Ho function of less than about +3.

The concentration of solvent and water contained therein is conveniently regulated by the addition to the solvent of controlled amounts of any solvent miscible-water immiscible liquid diluent employed in the process of the above-referred to application, liquid hydrocarbons being preferred, e.g., kerosene. Thus, the concentration of both donor solvent and water is varied in accordance with the amount of diluent added, the greater the amount of diluent the less the concentration of water and solvent. Dilution of the solvent phase, therefore, contributes directly to an increase in oxidation rate, i.e., in proportion to the amount of diluent added. Generally a volume ratio of donor solvent to diluent within the range of about 0.1:1 to 10:1 is advantageously employed.

The amount of water present in the solvent phase is preferably in excess of that required for the oxidation reaction and is generally present in a volume ratio of donor solvent to water within the range of about 0.1:1 to 10:1, preferably about 0.4:1 to 3:1.

In the utilization of free oxygen as the oxiding agent, any suitable gas stream can be employed so long as the nonoxygen components thereof are chemically inert in the system. Thus, air, diluted with nitrogen or carbon dioxide, or the like, can be advantageously employed. Generally, the nitrogen oxide-containing stream is one obtained from a process utilizing air, such as an ammonia oxidation or a nitrogen fixation process so that the residual free oxygen functions as the oxidizing agent without the need for adding a supplementary oxidizing stream.

Although we prefer generally to employ a gaseous stream of oxiding agent, as described above, numerous other oxidizing agents can be utilized if desired. Thus, hydrogen peroxide, perchloric acid, potassium, permanganate, potassium dichromate, perchloric acid or its salts, peroxides such as peracetic acid, sodium peroxide, cumyl peroxide and the like can be employed. These oxidants can be used in conjunction with air, if desired. Thus, by way of further example, the rate of air oxidation of nitrogen trioxide is greatly increased by adding hydrogen peroxide to the solution.

The above form of kinetic expression set forth with reference to tri-n-butyl phosphate varies somewhat from solvent to solvent but in any event the effect of dilution as above described is the same. In some cases, such as in the case of dimethyl formamide, the reaction rate is proportional to the oxygen pressure, whereas in the case of tri-n-butyl phosphate oxygen pressure does not affect the oxidation rate.

The invention is illustrated with reference to FIGURES 1 and 2 of the drawings, each of which illustrates an embodiment wherein the electron donor solvent enriched by absorption of nitrogen oxides and/or nitrous acid, from gas streams containing same, is separated from its absorbed fixed nitrogen components by oxidation of the same to nitric acid followed by removal of the resulting nitric acid from the system.

With reference to FIGURE 1, an effluent nitrogen oxide-containing gas stream such as from ammonia oxidation, or nitrogen fixation, or the like, and containing from 0.2 to 11 volume percent nitrogen oxides is passed into chamber 11 via line 10 in countercurrent flow contact with downwardly flowing electron donor solvent such as tri-n-butyl phosphate introduced from line 12 via distributor member 13 and passed over the surfaces of a suitable packing 14 such as Raschig rings, or saddles, or the like supported on perforate support 9.

The donor solvent in contact with packing 14 in chamber 11 contains water in the above described molar ratio range, preferably in a solvent to water molar ratio of from about 0.4:1 to 3:1 and is diluted with a suitable hydrocarbon oil diluent such as kerosene in the above described volume ratio of donor solvent to kerosene.

The absorption in chamber 11 is maintained at any suitable temperature, the upper temperature being limited to that at which the solvent is thermally stable, which for tri-n-butyl phosphate is as high as about 150° C. However, a temperature of, say, 20–30° C. can be utilized in most instances. The diluent, e.g., kerosene, as above described, serves as a regulant for water concentration in the solvent during absorption. As disclosed and claimed in the above referred to copending application, the donor solvent absorption efficiency is greatly facilitated by the presence of a limited amount of water, the optimum amount being somewhat different for each solvent. However, the volume ratio of donor solvent to diluent, employed for the absorption, is usually in the above described volume ratio range of from 0.2:1 to 5:1.

Residual gases are passed from chamber 11 via line 16 to scrubber 17 through a body of scrubbing liquid therein such as a hydrocarbon oil which is of the same composition as the diluent in chamber 11. Oil in chamber 17 entraps any solvent vapors passed via line 16 and resulting enriched oil is returned to chamber 11 via lines 18a and 21. Residual gases are passed from chamber 17 via line 18b. Make up oil absorbent for chamber 17 is added via conduit 18c. Kerosene is a preferred solvent diluent for tri-n-butyl phosphate and is generally utilized in a volume ratio to tri-n-butyl phosphate, preferably up to about 3:1. Initially added oil, water, and donor solvent as well as any required make up proportions of these liquids are introduced into the system respectively via lines 20, 22 and 25.

Total liquid phase, including enriched solvent, water, and diluent, is passed from chamber 11 into chamber 26 via line 23, pump 24 and line 27, together with air as an oxidizing gas introduced via line 28. Total liquid and oxidizing gas is passed upwardly through chamber 26 in contact with a solid Lewis catalyst 30 such as an ion exchange resin, for example, a polymerized sulfonated vinyl benzene (Dowex 50, Dowex 50-W, Amberlite IR-120), a polyacrylic acid (Amberlite IRC-50), a zeolite clay, or the like, which serves as a catalyst for the oxidation of nitrogen oxides and nitrous acid in chamber 26 to nitric acid.

The liquid-gas temperature in chamber 26 is generally in the order of 20–30° C. but in any event below thermal instability temperatures of the solvent. Air introduced into chamber 26 is added in proportions to provide free oxygen in an amount generally in excess of the stoichiometric proportions of nitrogen oxides and nitrous acid to be oxidized to nitric acid. Total liquid from chamber 26, containing nitric acid, is discharged via line 31 to any suitable liquid treating zone 32 wherein residual gas is separated for discharge via line 33 and wherein total liquid phase from line 31 is treated for removal of nitric acid as aqueous nitric acid and/or aqueous ammonium nitrate via line 34 to provide residual solvent for recycle via lines 35 and 12 to chamber 11.

Electron donor containing nitrogen oxides and/or nitrous acid can be introduced via line 29 into chamber 26 from any source together with or in lieu of that passed to chamber 26 from chamber 11 and line 23 as desired, water being added, when desired, via line 22a. Particularly in the practice of that embodiment, lean donor solvent from zone 32 can be withdrawn via line 40 in lieu of recycle to an absorption zone 11.

We have found that the distribution coefficient for nitrous acid, i.e., ratio of $HNO_2$ molarity in water to $HNO_2$ molarity in the donor solvent is in the order of about 0.002 to 0.05 depending upon temperature, concentrations and pH of the solutions. Consequently, separation of nitrous acid from the donor solvent by water washing is unsatisfactory. Separation of nitrogen oxides from the donor solvent is also unsatisfactory in view of the low coefficient of distribution of the oxides from the solvent into the water. However, we have found that the distribution coefficient of nitric acid, between the donor solvent and water is generally in the range of about 1:1 to 20:1, i.e., ratio of nitric acid extracted into the water to nitric acid remaining in the solvent. Accordingly, the oxidation in conjunction with subsequent water extraction, in accordance with the invention, is most advantageously employed to effect an efficient removal of the nitrous acid and nitrogen oxides from the solvent to provide for its recycle to the absorption zone. One such step in zone 32 is, therefore, a water extraction of nitric acid from the residual liquid and discharge of resulting aqueous nitric acid via line 34.

We have further discovered that an even more efficient removal of nitric acid from the solvent in zone 32 is accomplished by passing ammonia gas or aqueous alkali metal hydroxide, or ammonium hydroxide in contact with the nitric acid-water-containing donor solution to form alkali metal or ammonium nitrate. Resulting nitrate formed by reaction with at least one of the ammonia alkali metal hydroxide and ammonium hydroxide is passed from the system via line 34 as aqueous nitrate. The nitric acid salt route is particularly advantageous in view of the high distribution coefficient for ammonium nitrate between the water phase and the solvent phase which is in the order of 50–500 times greater than that for nitric acid as illustrated with reference to the following tabulation:

| Species Water-Extracted | Organic Phase | Distribution Coefficient [1] |
|---|---|---|
| $HNO_3$ | Tri-n-butyl Phosphate | 1.1 |
| $HNO_3$ | 50% Tri-n-butyl Phosphate, 50% Kerosene (diluent) | 2.8 |
| $HNO_3$ | 20% Tri-n-butyl Phosphate, 80% Kerosene | 7.5 |
| $HNO_2$ | Tri-n-butyl Phosphate (no diluent) | 0.01 |
| $NH_4NO_3$ | Tri-n-butyl Phosphate (no diluent) | 500 |
| $NH_4NO_3$ | 50% Tri-n-butyl Phosphate, 50% Kerosene | 1000 |
| $NaNO_3$ | 20% Tri-n-butyl Phosphate, 80% Kerosene | 100 |

[1] Ratio of molarity of acid or salt in water to molarity of acid or salt in organic phase.

As noted with reference to the above tabulation, ammonium nitrate distribution coefficients are higher when the donor solvent contains a diluent oil than when no diluent is present. Accordingly, when a diluent is present in the solvent, somewhat higher aqueous nitric acid concentrations in the water phase can be accomplished than when no diluent is present. As further illustrated with reference to the table, by passing ammonia through the solution, or by extraction with aqueous sodium hydroxide or ammonium hydroxide, after oxidation, the distribution coefficient of the nitrate is many times greater than that of the nitric acid, obtained when utilizing straight water extraction.

Figure 2:
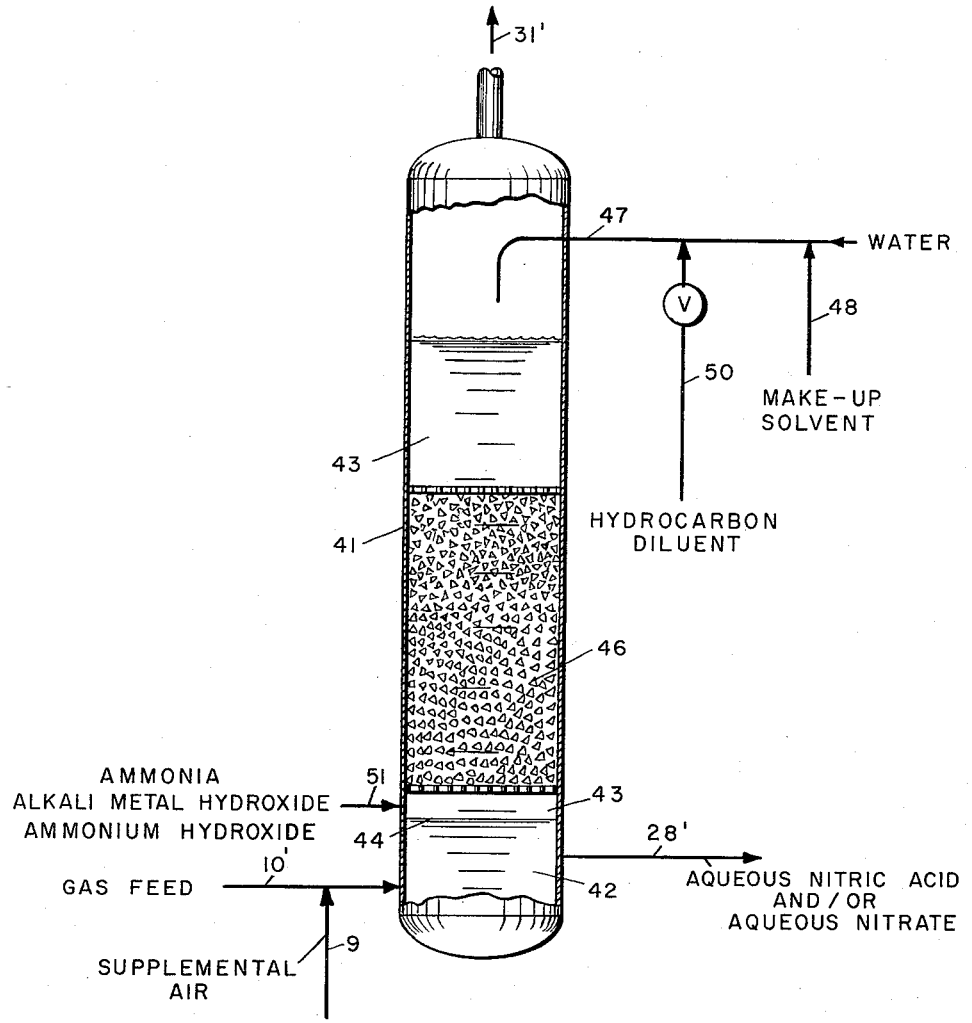

With reference to FIGURE 2 is illustrated an embodiment wherein nitrogen oxides and nitrous acid are absorbed from a gas stream containing same and simultaneously oxidized, to provide nitric acid for removal from the system in aqueous form or as aqueous nitrate via line 28'. When desired, the nitric acid can be reacted in situ with ammonia, ammonium hydroxide or alkali metal hydroxide to form the corresponding nitrate, which is characterized by a distribution coefficient markedly higher than that of nitric acid, above described. Nitrous acid and/or nitrogen oxide-bearing feed gas is introduced via line 10' into chamber 41. Gas fed through line 10' is generally that from a process containing air so that a sufficient amount of free oxygen is present for accomplishing oxidation of the nitrogen oxide and/or nitrous acid components to nitric acid. Feed gas from line 10' is passed into chamber 41 upwardly through water column 42 and electron donor solvent 43, preferably tri-n-butyl phosphate. Solvent 43, water saturated and containing a hydrocarbon diluent from line 50, preferably kerosene, in a volume ratio of donor solvent to diluent of from 0.2:1 to 5:1, is superposed on water column 42 at interface 44, and is in contact with solid Lewis acid 46 within the solvent body 43. Nitrous acid and/or nitrogen oxide-containing gas passes upwardly through the water column 42 without appreciable reaction with the water. The nitrogen oxides and/or nitrous acid are then simultaneously absorbed in solvent 43 and air oxidized in contact with catalyst 46 to nitric acid at under temperature conditions the same as that described with reference to chamber 26 of FIGURE 1.

The nitric acid is extracted into the water layer 42, which extraction is facilitated by flow of make up water from line 47 to column 42 via the solvent body 43. A dilute aqueous solution of nitric acid is withdrawn from the water column 22 via line 28'. By adjusting the rate of water addition, the concentration of nitric acid formed can be controlled to provide acid concentrations of from 10 to 40 percent or higher. Additional agitation is provided by the flow of air fed through the water layer as part of the gas feed stream, or as a supplementary stream, to facilitate extraction of nitric acid into the water layer and to blow unoxidized nitrogen oxides and/or nitrous acid or those absorbed from the feed into the water, back into the solvent so that very little, if any, nitrogen oxide or nitrous acid is lost to the aqueous stream withdrawn via line 28'.

Free ammonia, or aqueous alkali metal (including ammonium) hydroxide, can be introduced into the chamber 41 via line 51 in contact with solvent 43 to react with nitric acid therein to form alkali metal (or ammonium) nitrate in situ. Alkali metal, or ammonium, nitrate is extracted into water in chamber 41 and withdrawn from water column 42 as aqueous nitrate via line 28'. Alkali metal hydroxides introduced into the system via line 51 are less satisfactory than ammonia or ammonium hydroxide as is apparent from the distribution coefficient therefor shown with reference to the table hereinabove.

The following examples are further illustrative of the invention.

EXAMPLE 1

A series of groups of runs was made employing apparatus constituting separate absorption and oxidation chambers of the type illustrated with reference to FIG. 1 employing in all instances tributyl phosphate (TBP) as the electron donor solvent together with a kerosene fraction as the hydrocarbon oil diluent. Each series of runs was made at a temperature, in each chamber, of about 25° C. and at the pressure designated. The procedure was that consonant with description hereinabove with reference to process of FIG. 1. The resulting data are set forth in the following tabulation (Table I) with reference to like numbered streams of FIG. 1.

*Table I*

| Group I [1] | Grams per Hour | | | | | | | | | |
|---|---|---|---|---|---|---|---|---|---|---|
| | $N_2$ | $O_2$ | $H_2O$ | $NO_2$ | $NO$ | TBP | Oil | $HNO_3$ | $HNO_2$ | $NH_4NO_3$ |
| Line No. of Fig. 1: | | | | | | | | | | |
| 10 | 3,570 | 1,080 | 50.5 | 7.3 | 4.8 | | | | | |
| 12+21 | | | | | | 598 | 548 | 11.5 | 0 | 0 |
| 23 | | | | | | 598 | 548 | 13.5 | 10.0 | 0 |
| 31 | | | | | | 598 | 548 | 26.1 | 0.6 | 0 |
| 34 | | | | | | 598 | 548 | 11.5 | 0.6 | 19.6 |
| 16 | 3,570 | 1,080 | 50.5 | 0 | 1.9 | | | | | |

| Group II [2] | Grams per Hour | | | | | | | | | |
|---|---|---|---|---|---|---|---|---|---|---|
| | $N_2$ | $O_2$ | $H_2O$ | $NO_2$ | $NO$ | TBP | Oil | $HNO_3$ | $HNO_2$ | $NH_4NO_3$ |
| Line No. of Fig. 1: | | | | | | | | | | |
| 10 | 4,300 | 1,520 | 7.1 | 7.3 | 47.5 | | | | | |
| 12+21 | | | | | | 360 | 330 | 7.0 | 0 | 0 |
| 23 | | | | | | 360 | 330 | 9.0 | 10.0 | 0 |
| 31 | | | | | | 360 | 330 | 21.6 | 0.4 | 0 |
| 34 | | | | | | 360 | 330 | 7.0 | 0.4 | 20.1 |
| 16 | 4,300 | 1,520 | 7.1 | 0 | 1.9 | | | | | |

| Group III [3] | Grams per Hour | | | | | | | | | |
|---|---|---|---|---|---|---|---|---|---|---|
| | $N_2$ | $O_2$ | $H_2O$ | $NO_2$ | NO | TBP | Oil | $HNO_3$ | $HNO_2$ | $NH_4NO_3$ |
| Line No. of Fig. 1: | | | | | | | | | | |
| 10 | 3,430 | 1,040 | 505 | 14.6 | 9.5 | | | | | |
| 12+21 | | | | | | 786 | 720 | 15 | 0 | 0 |
| 23 | | | | | | 786 | 720 | 17 | 25.4 | 0 |
| 31 | | | | | | 786 | 720 | 50 | .8 | 0 |
| 34 | | | | | | 786 | 720 | 15 | .8 | 44.4 |
| 16 | 3,430 | 1,040 | 505 | 0 | 1.9 | | | | | |

| Group IV [4] | Grams per Hour | | | | | | | | | |
|---|---|---|---|---|---|---|---|---|---|---|
| | $N_2$ | $O_2$ | $H_2O$ | $NO_2$ | NO | TBP | Oil | $HNO_3$ | $HNO_2$ | $NH_4NO_3$ |
| Line No. of Fig. 1: | | | | | | | | | | |
| 10 | 4,270 | 1,510 | 7.2 | 14.6 | 9.5 | | | | | |
| 12+21 | | | | | | 720 | 660 | 14.0 | 0 | 0 |
| 23 | | | | | | 720 | 660 | 16.0 | 25.4 | 0 |
| 31 | | | | | | 720 | 660 | 49.2 | 0.7 | 0 |
| 34 | | | | | | 720 | 660 | 14.0 | 0.7 | 44.8 |
| 16 | 4,270 | 1,510 | 7.2 | 0 | 1.9 | | | | | |

[1] 0.20 volume percent nitrogen oxides in gas stream 1.0 atmos. pressure.
[2] 1.25 volume percent nitrogen oxides in gas stream 1.0 atmos. pressure.
[3] 0.40 volume percent nitrogen oxides in gas stream 1.0 atmos. pressure.
[4] 0.40 volume percent nitrogen oxides in gas stream 6.0 atmos. pressure.

EXAMPLE 2

The following tabulation, Table II, sets forth run data which demonstrate the oxidation reaction of the process of this invention. In each run, the solution of nitrous acid in the donor solvent was prepared so as to contain fixed nitrogen having an average oxidation state of 3. The resulting solution was transferred to a Parr shaker chamber, mounted on a shaker. The gas reservoir of the Parr shaker was flushed with nitrogen and oxygen was then introduced into the closed chamber, together with operation of the shaker to provide agitation. Oxygen was fed into the reaction mixture at a rate sufficient to maintain constant pressure shown in Table II. From the rate of feed of oxygen the total amount of nitrous acid oxidized was determined. Corroborative tests for determination of the degree of nitrous acid oxidation were made by analysis of the final product for nitrous and nitric acid. The nitrous acid was found to have been stoichiometrically converted to nitric acid.

The following kinetic expression also referred to hereinabove, was found to characterize the rate of nitrous acid oxidation (Table II) in the tributyl phosphate donor solvent:

$$k_1 = \frac{\text{Rate}\,[H_2O][TBP]}{[HNO_2][A]}$$

wherein all quantities are expressed as gram mols per liter and "TBP" and "A" designate tributyl phosphate and acid respectively. Although the foregoing kinetic expression is not followed exactly when donor solvents other than tributyl phosphate are utilized, the value of $k_1$, although approximate, is indicative of the reaction rate in each instance.

As indicated by the $k_1$ values of Table II the total acid concentration in the reaction mixture, i.e., including the acid catalyst and nitric acid present, increases the reaction rate in proportion to the amount of acid present. This demonstrates in light of the above kinetic expres-

*Table II*

OXIDATION OF NITROUS ACID, IN TRIBUTYL PHOSPHATE, TO NITRIC ACID

| Run No. | Ml. Solvent | Ml. Water | Ml. Cyclohexane | Grams Lewis Acid Catalyst | °C. Temp. | $P_{O_2}$ p.s.i. | $[HNO_2]_0$ [8] | $[HNO_3]_0$ [8] | $k_1$ |
|---|---|---|---|---|---|---|---|---|---|
| | | | | | | | Gram moles/liter | | |
| 1 | 150 TBP [1] | 50 | 0 | 0 | 26 | 3.5 | 2.00 | 0.73 | 0.20 |
| 2 | 150 TBP [1] | 50 | 0 | 50 Dowex-50-W [7] | 21 | 8.0 | 2.00 | .37 | 0.18 |
| 3 | 150 TBP [1] | 50 | 0 | do. [7] | 23 | 8.0 | 2.00 | .00 | 0.20 |
| 4 | 75 TBP [1] | 50 | 75 | 0 | 22 | 8.0 | 2.00 | .37 | 0.20 |
| 5 | 75 TBP [1] | 50 | 75 | 100 Dowex-50-W [7] | 27 | 3.0 | 2.00 | .73 | .18 |
| 6 | 150 TBP [1] | 3 | 0 | 50 Dowex-50-W [7] | 25 | 8.0 | 2.00 | .37 | .21 |
| 7 | 150 TBP [1] | 50 | 0 | do. [7] | 23 | 1.5 | 2.00 | .37 | .20 |
| 8 | 150 DMF [2] | 20 | 0 | 0 | 25 | 8.0 | 1.50 | .28 | ~.011 |
| 9 | 150 DMSO [3] | 20 | 0 | 0 | 23 | 8.0 | 1.50 | .28 | ~.06 |
| 10 | 150 TEGDME [4] | 20 | 0 | 0 | 23 | 8.0 | 1.50 | .28 | ~.1 |
| 11 | 150 DMF [2] | 20 | 0 | 50 Dowex-50-W [7] | 23 | 8.0 | 1.50 | .28 | ~.045 |
| 12 | 150 TBP [1] | 50 | 0 | 20 Silica-alumina | 25 | 3.5 | 2.00 | .73 | [5] ~.2 |
| 13 | 150 TBP [1] | 50 | 0 | 2.0 NaOH | 27 | 8.0 | 2.00 | 0 | 0.00 |
| 14 | 150 TBP [1] | 50 | 0 | 20 Super filtrol | 26 | 3.5 | 2.00 | .73 | [6] ~.2 |

[1] Tributyl phosphate.
[2] Dimethyl formamide.
[3] Dimethyl sulfoxide.
[4] Triethylene glycol dimethyl ether.
[5] Rate constant was calculated based on silica-alumina catalyst acidity of 2.0 mequiv. per gram.
[6] Rate constant was calculated based on Super filtrol catalyst acidity of 0.35 mequiv. per gram.
[7] A polymerized sulfonated vinyl benzene.
[8] Initial concentration.

sion that the total acid functions as a catalyst for the oxidation, and in no other manner, which is further illustrated with reference to run No. 13 wherein no reaction was obtained when the solution was basic rather than acidic.

EXAMPLE 3

A stream of air containing, on a weight basis, 0.14 percent NO and 0.30 percent $NO_2$ was passed into and through apparatus, of the type illustrated with reference to FIG. 2 of the drawings, containing a layer of 150 ml. of tri-n-butyl phosphate as the liquid donor solvent superposed on a layer of 100 ml. of water, in the presence of about 0.2 molar nitric acid as the catalyst. Effluent gas from the chamber was analyzed periodically by passing the same through a condenser and a 100 mm. spectrophotometer absorption cell, the gas being thereby continuously analyzed by the ultraviolet absorptivity at 2260° A. for NO and 4480° A. for $NO_2+N_2O_4$. Water was continuously introduced at the top of the chamber above the donor solvent layer at a rate of 60 ml./hour, the gas stream being fed at a rate of 3000 cc./minute. The system was maintained at room temperature and at atmospheric pressure, at a constant liquid level. The following tabulation, Table III, sets forth the outlet gas and aqueous effluent composition.

*Table III*

| Time From Start of Run (Min.) | Outlet Gas Composition, Wt. Percent | | Aqueous Effluent Composition, Molarity | | Wt. Percent Nitrogen Oxides Recovered as Nitric Acid |
|---|---|---|---|---|---|
| | NO | $NO_2$ | $HNO_2+HNO_3$ | $HNO_2$ | |
| 25 | 0.08 | 0.00 | >0.20 | <0.002 | 82 |
| 60 | 0.08 | 0.01 | >0.20 | <0.002 | 82 |
| 666 | 0.10 | 0.01 | 0.35 | <0.002 | 78 |
| 700 | 0.10 | 0.01 | 0.40 | <0.002 | 78 |

EXAMPLE 4

A run similar to that of Example 3 employing the same apparatus was carried out except that the donor solvent consisted of 85 ml. tri-n-butyl phosphate and 85 ml. decalin. The water layer consisted of 55 ml. water and contained, as an acid catalyst, 45 grams of a sulfonated polymerized vinyl benzene, an ion exchange resin containing 4 milliequivalents H+ gram. The data are summarized in the following tabulation.

*Table IV*

| Time From Start of Run (Min.) | Outlet Gas Composition, Wt. Percent | | Aqueous Effluent Composition, Molarity | | Wt. Percent Nitrogen Oxides Recovered as Nitric Acid |
|---|---|---|---|---|---|
| | NO | $NO_2$ | $HNO_2+HNO_3$ | $HNO_2$ | |
| 252 | 0.07 | 0.03 | 0.30 | nil | 78 |
| 1,275 | 0.09 | 0.03 | 0.39 | nil | 73 |
| 1,381 | 0.08 | 0.04 | 0.26 | nil | 73 |
| 1,424 | 0.07 | 0.04 | 0.20 | nil | 75 |
| 1,509 | 0.08 | 0.05 | 0.18 | nil | 71 |

EXAMPLE 5

A run similar to that of Example 4 was made except that the water layer contained 75 ml. water, the water rate was 250 ml./hour, and the acid catalyst was a 0.2 molar solution of nitric acid. The pressure of the system was a few mm. above atmospheric. The data are summarized in the following tabulation.

*Table V*

| Time From Start of Run (Min.) | Outlet Gas Composition, Wt. Percent | | Aqueous Effluent Composition, Molarity | | Wt. Percent Nitrogen Oxides Recovered as Nitric Acid |
|---|---|---|---|---|---|
| | NO | $NO_2$ | $HNO_2+HNO_3$ | $HNO_2$ | |
| 21 | 0.04 | 0.02 | >0.20 | <0.002 | 87 |
| 391 | 0.07 | 0.02 | 0.25 | <0.002 | 80 |
| 426 | 0.08 | 0.02 | 0.30 | <0.002 | 78 |
| 455 | 0.07 | 0.02 | 0.35 | <0.002 | 80 |
| 985 | 0.07 | 0.03 | 0.39 | <0.002 | 78 |

The invention, although generally applied to the separation of fixed nitrogen from liquid electron donor compounds, is nevertheless applicable to separation of fixed nitrogen from solid donor compounds. Thus, a solid donor, e.g., ground triphenyl phosphate, enriched with absorbed nitrogen oxides and/or nitrous acid is slurried with water and a body of Lewis acid, preferably liquid, to effect the oxidation step. In this manner, the nitric acid formed is extracted into the water phase for recovery as aqueous nitric acid, and residual solid donor, substantially free from absorbed fixed nitrogen, is in condition for reuse.

As particularly illustrated with reference to the drawings, the enriched liquid electron donor solvents to which the oxidation step of the invention is preferably applied are those of the now preferred group herein referred to with reference to copending application Serial No. 738,717, namely, dimethylformamide, triethyleneglycol dimethyl ether, dimethylsulfoxide, hexamethyl phosphoramide, and tri-n-butyl phosphate. These solvents, upon being freed from fixed nitrogen, are easily separated from water phase in contact therewith, for reuse, or when desired can be easily maintained water saturated, at a desired water concentration value, by the presence of diluent therein. These solvents, therefore, are particularly adaptable to the regulation of oxidation rate, and of the distribution coefficient of nitric acid and/or the nitric acid salt between the solvent and water.

However, when substantially completely water miscible solvents are employed, water content in the solvent can be regulated by use of a diluent, although generally a larger amount of diluent is required than for partially water miscible water solvents. Nitric acid or nitric acid salts are, in the case of removal of fixed nitrogen from highly water miscible solvents, separated by distillation of the total liquid body of solvent and diluent and water displaced from the solvent by the diluent, or alternatively, by distillation of the two separate phases.

By the term Lewis acid, it is meant "a substance capable of accepting a pair of electrons from a base" (G. N. Lewis, "Valence and the Structure of Atoms and Molecules," the Chem. Cat. Co., N.Y.C., 1923). Exemplary of various Lewis acids are Bronstead acids (e.g., nitric, sulfuric, hydrochloric, phosphoric, acetic, benzoic acids), acid clays, (e.g., silica alumina, superfiltrol, cracking catalysts), ferric chloride, aluminum chloride and the like.

When referring herein to the removal of nitrogen oxides from donor compounds we are aware that electron donor compounds contemplated herein generally exhibit relatively little, if any, absorptive power for nitrous oxide and pure nitric oxide. Therefore, although it is within the scope of the invention to separate the donor solvent from all nitrogen oxides contained therein, nitrous oxide and pure nitric oxide, if present in the solvent phase to be oxidized, will be present in a very small proportion.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. In a process for the separation of an electron donor compound from a nitrogen compound solvated therewith and selected from the group consisting of nitric oxide, nitrogen dioxide, nitrogen trioxide, nitrogen tetroxide, nitrogen pentoxide and nitrous acid, said electron donor compound being chemically reactive with said nitrogen compound only by sharing electrons therewith and also exhibiting selective absorption action for acetylene by sharing electrons with said acetylene, and said donor compound being selected from the group consisting of glycol ethers, alkyl phosphates, aryl phosphates, dialkyl amides, alkyl sulfoxides and alkyl phosphoramides, the improvement which comprises contacting the electron donor compound-nitrogen compound solvate with a free oxygen-containing gas in the presence of an acid material characterized by a Hammett Ho function less than +3 under temperature conditions for effecting oxidation of the said solvated nitrogen compound by said free oxygen-containing gas to nitric acid, and when said solvated nitrogen compound is a nitrogen oxide, maintaining a sufficient amount of water in the zone of said contacting to react the said oxide together with oxidation of same by said free oxygen-containing gas to cause the said oxidation to nitric acid, and then removing nitric acid so produced from the resulting electron donor compound-nitric acid mixture.

2. A process of claim 1, wherein said donor compound is a liquid.

3. A process of claim 2, wherein said donor compound is incompletely miscible with water, and said nitric acid is removed from said donor-nitric acid mixture by water washing, as aqueous nitric acid.

4. A process of claim 2, wherein said donor compound is incompletely miscible with water, and said nitric acid is removed from said donor compound nitric acid mixture by contacting said mixture with a compound selected from the group consisting of free ammonia, ammonium hydroxide and an alkali metal hydroxide to react same with said nitric acid to form a nitrate, followed by water washing the resulting nitrate from said donor.

5. A process of claim 2, wherein a hydrocarbon diluent is maintained dissolved in said donor to regulate the content of water therein, wherein the volume ratio of said donor compound to said water is within the range of from 0.1:1 to 10:1, and wherein the volume ratio of said liquid donor compound to said diluent is within the range of from 0.2:1 to 5:1.

6. In a process for the separation of tri-n-butyl phosphate from a nitrogen compound solvated therewith and selected from the group consisting of nitric oxide, nitrogen dioxide, nitrogen trioxide, nitrogen tetroxide, nitrogen pentoxide and nitrous acid, and the resulting tri-n-butyl phosphate-nitrogen compound solvate being a liquid, the improvement which comprises passing a stream of said tri-n-butyl phosphate containing said nitrogen compound solvated therewith in contact with a free oxygen-containing gas and a solid acid material characterized by a Hammett Ho function less than +3, in the presence of water, under conditions suitable for effecting oxidation of the solvated nitrogen compound by said free oxygen-containing gas to nitric acid, passing separate streams of residual gas and total liquid from the zone of the said contacting, and then removing nitric acid from the said total liquid.

7. A process for the removal of a nitrogen compound selected from the group consisting of nitric oxide, nitrogen dioxide, nitrogen trioxide, nitrogen tetroxide, nitrogen pentoxide and nitrous acid, from a gas containing same, including the steps of absorbing said nitrogen compound in an incompletely water-miscible liquid electron donor compound, described hereinafter, and separation of the absorbed nitrogen compound from said electron donor compound, the said process comprising passing the said gas together with a free oxygen-containing gas upwardly through a layer of water and then through a layer of said electron donor compound superposed on said water layer and containing a layer of solid acid material characterized by a Hammett Ho function less than +3 under conditions for carrying water in said gas from said water layer into said liquid donor compound layer to provide a mole ratio of said donor to water contained therein within the range of from 0.4:1 to 10:1 and for causing solvation of said nitrogen compound with said electron donor compound and oxidation of the resulting solvated nitrogen compound, by said free oxygen-containing gas, to nitric acid, and when the said nitrogen compound-containing gas contains nitric oxide, maintaining the average oxidation state of the total fixed nitrogen therein at a minimum of 3.0, the said electron donor being reactive with said nitrogen compound only by sharing electrons therewith and exhibiting selective solvent action for acetylene by sharing electrons with said acetylene and being selected from the group consisting of glycol ethers, alkyl phosphates, aryl phosphates, dialkyl amides, alkyl sulfoxides and alkyl phosphoramides, passing residual gas from the zone containing said layers of water, acid material and donor compound and extracting resulting nitric acid from said layer of electron donor compound into said water layer.

8. A process for the removal of a nitrogen compound selected from the group consisting of nitric oxide, nitrogen dioxide, nitrogen trioxide, nitrogen tetroxide, nitrogen pentoxide and nitrous acid, from a gas containing same, including the steps of absorbing said nitrogen compound in a liquid electron donor compound, described hereinafter, and separation of the absorbed nitrogen compound from said electron donor compound, the said process comprising passing said gas through a first zone in contact therein with said liquid electron donor compound in the presence of water in an amount providing for a mole ratio of said donor compound to water therein within the range of from 0.4:1 to 10:1 under conditions causing absorption of said nitrogen compound by said electron donor, whereby said nitrogen compound is solvated with said electron donor, and when said gas contains nitric oxide, maintaining the average oxidation state of the total fixed nitrogen therein at a minimum of 3.0, passing total liquid from said first zone into a second zone, together with a free oxygen-containing gas, in contact with a solid acid material characterized by a Hammett Ho function less than +3, in the presence of water, under conditions for effecting oxidation of the said solvated nitrogen compound by said free oxygen-containing gas to nitric acid, and removing said nitric acid from the resulting mixture of same with said electron donor, said electron donor compound being reactive with said nitrogen compound only by sharing electrons therewith and exhibiting selective solvent action with acetylene by sharing electrons with said acetylene and being selected from the group consisting of glycol ethers, alkyl phosphates, aryl phosphates, dialkyl amides, alkyl sulfoxides and alkyl phosphoramides.

9. A process of claim 8 wherein said liquid electron donor is tri-n-butyl phosphate.

10. A process of claim 8 wherein said liquid electron donor is dimethyl formamide.

11. A process of claim 8 wherein said liquid electron donor is triethylene glycol dimethyl ether.

12. A process of claim 8 wherein said liquid electron donor is dimethyl sulfoxide.

13. A process of claim 8 wherein said liquid electron donor is hexamethyl phosphoramide.

14. A process of claim 7 wherein said liquid electron donor is tri-n-butyl phosphate.

(References on following page)

References Cited in the file of this patent

UNITED STATES PATENTS

| | | |
|---|---|---|
| 400,207 | Hake | Mar. 26, 1889 |
| 2,132,511 | Hentrich et al. | Oct. 11, 1938 |
| 2,566,197 | Hass et al. | Aug. 28, 1951 |

FOREIGN PATENTS

| | | |
|---|---|---|
| 267,874 | Germany | Nov. 27, 1912 |

OTHER REFERENCES

Webb: "Absorption of Nitrous Gases," Longmans, Green & Co., New York, N.Y., 1923, page 120.

UNITED STATES PATENT OFFICE
CERTIFICATION OF CORRECTION

Patent No. 3,044,853                            July 17, 1962

Lucien G. Maury et al.

It is hereby certified that error appears in the above numbered patent requiring correction and that the said Letters Patent should read as corrected below.

Column 2, line 40, for "base" read -- based --; column 4, in the tabulation, first column, last line thereof, for "Tricresylphosphate" read -- Tricresylphosphate --; column 6, in the tabulation, second column, and opposite "$NH^4NO_3$", for "50% Tri-n-butyl" read -- 50% Tri-n-butyl Phosphate --; same column, and opposite "$NaNO_3$", for "20% Tri-n-butyl" read -- 20% Tri-n-butyl Phosphate --; column 11, line 51, for "$H^+$ gram." read -- $H^+$/gram. --.

Signed and sealed this 6th day of November 1962.

(SEAL)
Attest:

ERNEST W. SWIDER
Attesting Officer

DAVID L. LADD
Commissioner of Patents